Sept. 22, 1953   H. B. RICHIE   2,652,581
SCRAPING IMPLEMENT
Filed Sept. 29, 1949

INVENTOR.
Harold B. Richie
BY
R. G. Story
ATTORNEY

Patented Sept. 22, 1953

2,652,581

UNITED STATES PATENT OFFICE 2,652,581

SCRAPING IMPLEMENT

Harold B. Richie, Chicago, Ill., assignor to Swift & Company, Chicago, Ill., a corporation of Illinois Application September 29, 1949, Serial No. 118,642

2 Claims. (Cl. 15—236)

This invention relates to an improved scraping implement.

One of the objects of the present invention is to provide an improved cleaning implement in coil form particularly adapted for cleaning equipment, such as cooking vats, pasteurizing vats, or any containers used in the processing and/or holding of food or food products and to which particles of food or food products or any other material might adhere.

Other objects will be apparent from the description and claims which follow.

Figure 1:
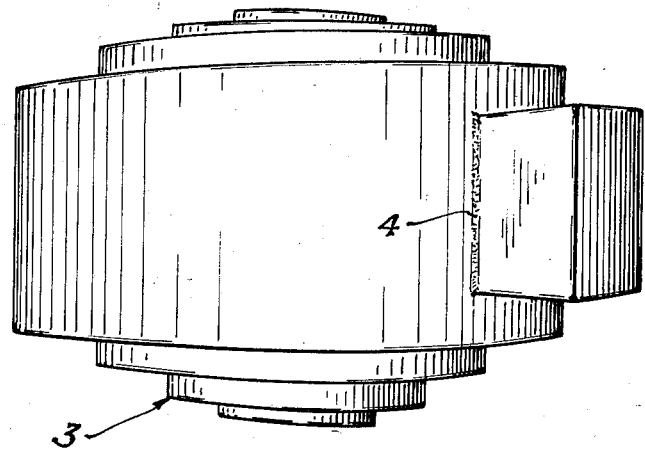
Figure 2:
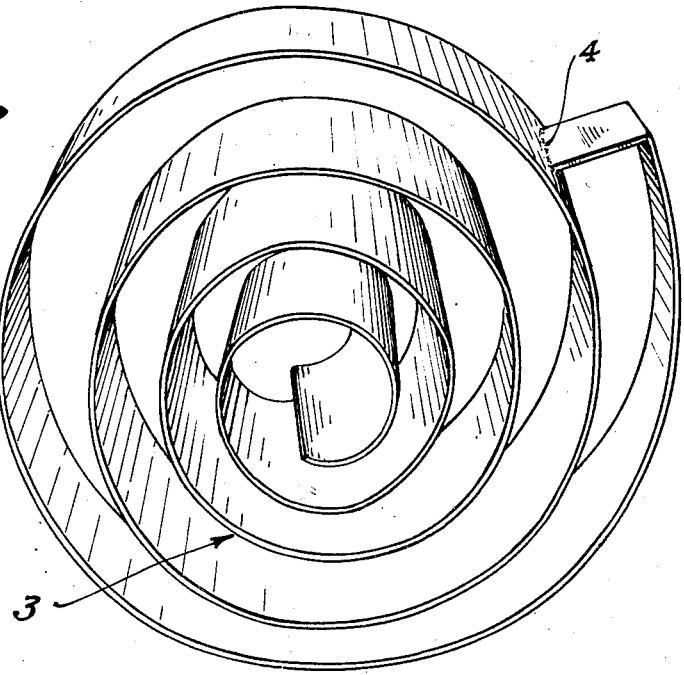

The cleaning implement of the present invention preferably takes the form shown in the drawing in which Figure 1 is an isometric view and Figure 2 a plan view thereof.

Preferably, the cleaning implement comprises a sufficiently flexible strip of stainless steel or other similar metal 3, of any suitable length depending on the desired diameter of the finished implement, and coiled upon itself into any desired number of convolutions. The end of the strip on the outside of the coil is rigidly secured, as by welding or the like, to its anterior coil as at 4.

While the implement shown in the drawing is illustrated as having five convolutions, obviously the number thereof may be increased or decreased to any desired number consistent with the amount of cleaning surface desired and the diameter of the coil to be produced.

The end of the strip at the center of the coil may be welded or otherwise rigidly secured to its adjacent coil should further rigidity in the finished coil be desired, or a suitable handle (not shown) may be suitably provided to aid in handling the implement.

While a conically shaped coil is illustrated in the drawing with the width of the strip of metal increasing from the outside of the coil to the center thereof, it is obvious that the width of the strip may remain constant so that a flat coil may be produced if desired.

It will be seen that a plurality of cleaning or scraping surfaces have been provided by the implement of the present invention and that the strip may have either rounded or right angle edges, depending upon the extent of the scraping or cutting action desired.

The cleaning implement of the present invention has particular applicability for cleaning sanitation equipment, such as cheese vats, dairy pasteurizing vats, meat cooking vats, meat trucks, filling hoppers, and the like, of adhering milk, meat, or other particles. It will be observed, too, that since the coil is rounded, it admirably fits the contour of the sides of these vessels as well as fitting the hand of the operator.

Obviously, many modifications and variations of the invention as hereinbefore set forth may be made without departing from the spirit and scope thereof, and therefore only such limitations should be imposed as are indicated in the appended claims.

I claim:

1. A cleaning implement for use in scraping interior walls of food containers of adhering food particles comprising a band of metal coiled into a plurality of convolutions, the center line of said band being in a single plane, and the outer end of said band being secured only to its anterior convolution to form a closed substantially circular periphery and the inner end of said band being free to provide resiliency whereby the coil may conform to the contour of the container being cleaned.

2. A conically shaped cleaning implement for use in scraping interior walls of food containers of adhering food particles comprising a band of metal coiled into a plurality of convolutions, the center line of said band being in a single plane, the width of the band increasing from the outer convolution to the innermost convolution thereof, and the outer end of said band being secured only to its anterior convolution to form a closed substantially circular periphery.

HAROLD B. RICHIE.

References Cited in the file of this patent

UNITED STATES PATENTS

| Number | Name | Date |
|---|---|---|
| 67,972 | Freeland et al. | Aug. 20, 1867 |
| 80,628 | Hobart | Aug. 4, 1868 |
| 220,986 | Plant | Oct. 28, 1879 |
| 629,768 | Campbell | Aug. 1, 1899 |
| 1,015,894 | Keller | Jan. 30, 1912 |
| 1,031,090 | Roze | July 2, 1912 |
| 1,930,977 | Kirch | Oct. 17, 1933 |
| 2,449,092 | Struble | Sept. 14, 1948 |

FOREIGN PATENTS

| Number | Country | Date |
|---|---|---|
| 3,054 | Great Britain | of 1866 |
| 101,197 | Germany | Jan. 21, 1899 |